United States Patent
Williams

(10) Patent No.: US 7,020,247 B1
(45) Date of Patent: Mar. 28, 2006

(54) METHODS AND SYSTEMS FOR AUTOMATED TARGET ERROR CHECKING

(75) Inventor: Cindy L. Williams, Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 268 days.

(21) Appl. No.: 10/098,987

(22) Filed: Mar. 15, 2002

(51) Int. Cl.
*H04M 1/24* (2006.01)
*H04M 3/24* (2006.01)

(52) U.S. Cl. .................... 379/15.03; 379/1.04

(58) Field of Classification Search ............. 379/15.02, 379/15.03, 9.02, 9.03, 9.04, 9, 1.01, 1.03, 379/1.04, 201.12

See application file for complete search history.

(56) References Cited

U.S. PATENT DOCUMENTS

| | | | |
|---|---|---|---|
| 5,687,224 A * | 11/1997 | Alley et al. ............ | 379/201.12 |
| 5,920,846 A | 7/1999 | Storch et al. .................. | 705/7 |
| 6,072,411 A | 6/2000 | Yoshioka ..................... | 341/94 |
| 6,295,540 B1 * | 9/2001 | Sanschagrin et al. ........ | 707/201 |

OTHER PUBLICATIONS

Using SIGS; http://www.rmkhome.com/~jack/SIGS/MANUAL3.HTM, SIGS Repair and Maintenance Services; Internet Download Jan. 18, 2002; pp. 1-10.
Using SIGS; http://www.rmkhome.com/~jack/SIGS/MANUAL.HTM, Using SIGS; Internet Download Jan. 18, 2002; pp. 1-3.
Using SIGS; http://www.rmkhome.com/~jack/SIGS/MANUAL2.HTM, Pre-Ordering Services from SIGS; Internet Download Jan. 18, 2002; pp. 1-20.
Telecordia Technologies; Service Provisioning and Activation; Internet Download Dec. 11, 2001; pp. 1-6.
Operating Support Systems (OSS); Tom Housel; Gougle Search—EXACT=Tom Housel, ALL=OSS; Internet Download Dec. 11, 2001.
NTCA Business & Technology; http://www.ntca.org/bus_tech/tech_eng/clli.html, Common Language Location Identification (CLLI) Codes; Internet Download Dec. 10, 2001.

* cited by examiner

*Primary Examiner*—Barry W Taylor
(74) *Attorney, Agent, or Firm*—Merchant & Gould

(57) ABSTRACT

The present invention provides methods and systems for automatically verifying target fields that, if incorrectly formatted, will disrupt flow-through operations in a telecommunications environment. Exemplary target fields which are critical for flow-through processing include an upstream target identifier (TID) field, a network element location field, an originating system field, an auto flow-through field, and a TIRKS System Entity Code (TIRKS SEC) field.

19 Claims, 8 Drawing Sheets

METHODS AND SYSTEMS FOR AUTOMATED TARGET ERROR CHECKING

FIELD OF THE INVENTION

The present invention relates generally to the field of telecommunications. More particularly, the present invention relates to methods and systems for automated target error checking.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

BACKGROUND

The telephone system is a vast network of interconnected components. The large number of components make the telephone network very complex to manage. In order to decrease the complexity of the network, to increase connection efficiency, and to improve customer service, a concept of operations known as flow-through is implemented by operators of major telecommunications networks, such as Regional Bell Operating Companies (RBOCs).

Flow-through is an automated process for provisioning communications circuits to satisfy a customer service request. Such a process results in the computer-initiated connection of network elements based upon database entries. These entries or records are comprised of various fields that are utilized in the implementation of flow-through.

Flow-through operations are a virtual necessity for the efficient functioning of large telecommunications networks, such as those maintained by RBOCs. These networks can frequently require that a substantial number of circuits be established or disabled/removed within a short period of time. To implement such changes manually would be very costly in time, money and manpower.

If flow-through operations are disrupted, the consequences can be serious. Communications circuits may not be able to be established, and a time-consuming search must be made for the cause of the disruption of flow-through. In a conventional environment, such a search may require at least one system administrator to proofread volumes of data in search of erroneous entries to certain data fields. After locating an error, the system administrator must then manually edit the entry to comport with the required format for the data field. To ensure that multiple errors do not exist, though, the system administrator may continue to proofread until all data has been examined. This is a very inefficient method for ensuring flow-through operations. Such a conventional process is very time consuming for system administrators. As a result, customers may experience poor service, including longer wait periods for service establishment.

What is needed are methods and systems that overcome the disadvantages of conventional systems. Such methods and systems should provide additional advantages, including cost effectiveness, flexibility, and ease of implementation.

BRIEF SUMMARY

An embodiment of the present invention provides for the automated review of target fields, which are used by an automated provisioning system. Implementations of the present invention comprise at least one of a method, a process, a system, an apparatus, a computer readable medium, and a data stream.

An embodiment of the present invention provides a method comprising receiving a line record, extracting a target field from the line record, and validating the target field. A further embodiment provides a logging capability, in which erroneous target fields are documented in a validation results file. Additionally, a validation results display or presentation mechanism (such as a graphical user interface) may be provided to a user of an embodiment.

Embodiments of the present invention verify line record target fields critical to the success of auto flow-through operations. Such target fields may include a network element location field, an upstream target identifier field, an auto flow-through field, an exception notice field, an originating system field, and a TIRKS System Entity Code (TIRKS SEC) field. TIRKS is also known as the Trunk Inventory Record Keeping System.

Many advantages over conventional processes are made available by various embodiments of the present invention. Since such embodiments automatically determine target field errors before such fields enter flow-through operations, flow through disruptions may be prevented. As a consequence, more efficient processing of customer requests is made possible.

Thus embodiments of the present invention may be executed periodically in a preventative mode to ensure the integrity of data fields necessary for flow-through operations. The frequency of execution may be set by a system administrator and based upon management needs.

In addition, such embodiments may be executed after a flow-through disruption has taken place in order to reduce the duration of such a disruption. Rather than require personnel to comb through provisioning data in an effort to determine the cause of a disruption, an embodiment of the present invention may be utilized to isolate an erroneous target field. In such an instance, an invention embodiment may be executed on a set of line records which are known to have or suspected of having an incorrect target field.

Whether used as a preventative maintenance tool or an error diagnostic tool, embodiments of the present invention may permit employees necessary for conventional practices to be applied to other tasks, resulting in personnel and cost savings. Other advantages that may be reaped as a consequence of maintaining continuous flow-through operations include a decrease in customer response time and an increase in customer satisfaction.

Additional objects, advantages, and novel features of the invention will be set forth in part in the description which follows, and in part will become more apparent to those skilled in the art upon examination of the following, or may be learned by practice of the invention.

DETAILED DESCRIPTION

As required, detailed embodiments of the present invention are disclosed herein. However, it is to be understood that the disclosed embodiments are merely exemplary of the invention that may be embodied in various and alternative forms. Specific structural and functional details disclosed herein are not to be interpreted as limiting, but merely as a basis for the claims and as a representative foundation for teaching one skilled in the art to variously employ the present invention. The present invention may be practiced without some or all of these specific details. In other instances, well known process operations have not been described in detail in order not to unnecessarily obscure the present invention.

Figure 1:
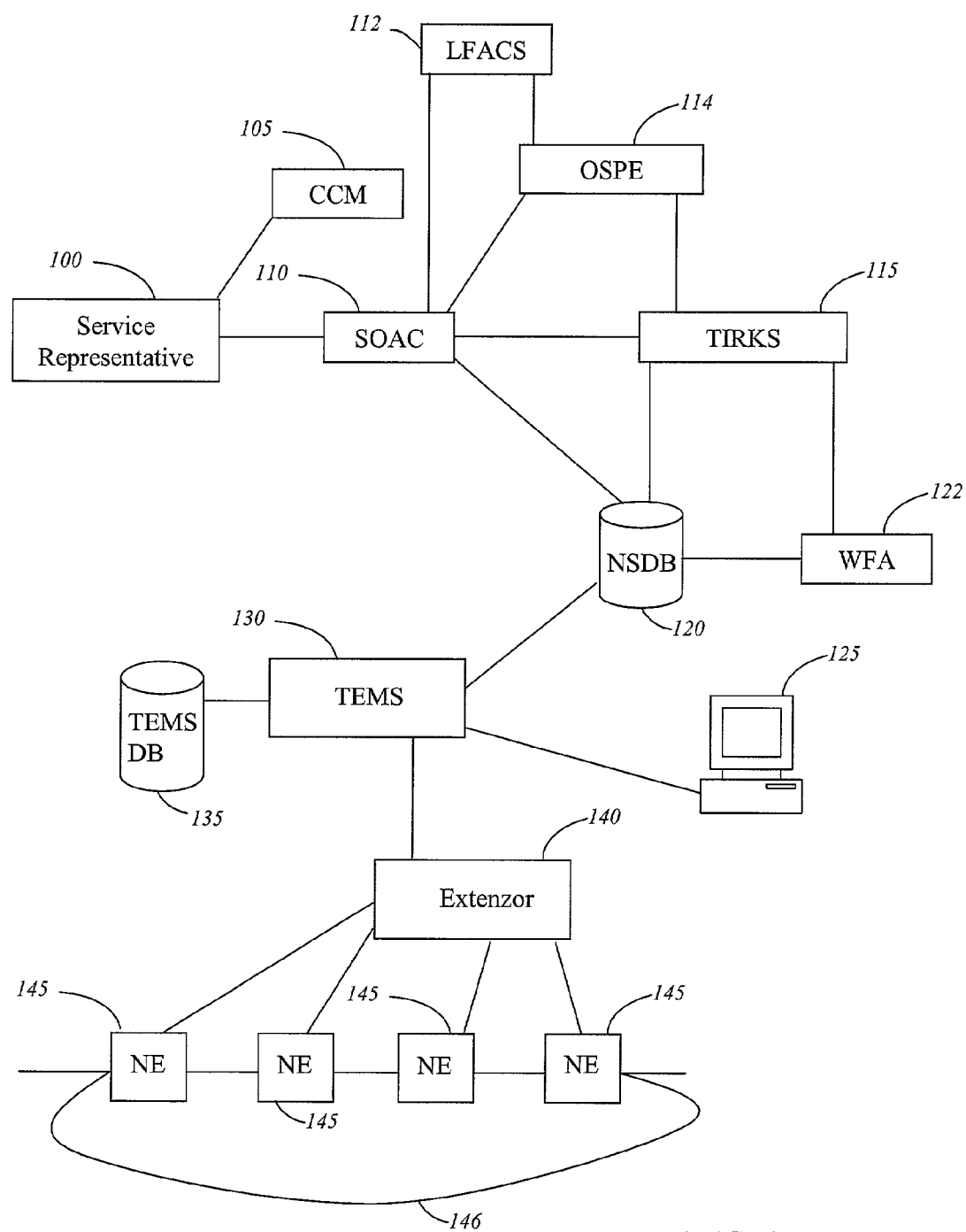
FIG. 1 comprises a functional block diagram illustrating an exemplary environment for provisioning telecommunications circuits.

Referring now to the drawings, in which like numerals indicate like elements throughout the several figures, FIG. 1 comprises a functional block diagram illustrating an exemplary environment for provisioning telecommunications circuits.

The provisioning of communications circuits begins with a request for service by a customer. Such a request is fielded by a service representative 100. The service representative 100 queries the customer regarding the type of service desired, often including bandwidth and connectivity requirements.

In an embodiment, the service representative 100 initiates a circuit provisioning process by forwarding a request for service to a Circuit Capacity Management (CCM) system 105. The CCM 105 comprises a processor for hosting software used to determine whether capacity exists to satisfy the customer service request. The results of this determination are subsequently communicated back to the service representative 100.

The service representative 100 then creates an electronic order and stores that order on a Service Order Analysis and Control (SOAC) computer system 110. SOAC 110 comprises a processor and software for communicating with other processing systems to determine the resources or network elements that are available to establish a telecommunications circuit which will satisfy the customer's request for service. Such other processing systems are subsequently discussed.

SOAC 110 forwards a loop assignment request to a computer processing system known as a Loop Facility Assignment and Control System (LFACS) 112. LFACS 112 is a processor that hosts software for determining an optimal cable pair or remote terminal for satisfying the customer request. LFACS 112 replies to SOAC 110 with specific cable pair information, by way of example, for requests requiring low bandwidth circuits (e.g., DS-0 circuits).

Another provisioning mechanism is utilized for high bandwidth (e.g., multiple DS-3 circuits) customer requests. High bandwidth requests generally require fiber optic assignments. Once a service representative 100 creates such an order within the SOAC system, that order is forwarded to an Outside Plant Engineer (OSPE) computer system 114. The OSPE 114 comprises a processor and software for use by a design engineer, for example, to search LFACS 112 for spare fiber cable pairs. Additionally, the OSPE 114 creates an electronic document called a DPRO (Digital PROvisioning). A DPRO contains cable pair information used for circuit design purposes.

The DPRO is forwarded to a Trunk Record Inventory Keeping System (TIRKS) 115. TIRKS 115 comprises a database server for the storage of circuit inventory records. A designer may subsequently access and utilize the DPRO document to configure add/drop multiplexers to implement high bandwidth (e.g., fiber optic) circuits.

TIRKS 115 essentially provides a database of currently used circuits. Communications path designers/engineers may use the information stored in TIRKS 115 to determine available paths and network elements (especially optical network elements) for implementing a communications circuit which will satisfy the customer service request. TIRKS 115 is a Telcordia system which provides inventory management for central office and outside plant facilities. Managed inventory data may include records relating to equipment components, frames, circuit assignments, and telecommunications equipment.

After end to end design is performed, records are sent from TIRKS 115 to a Work Force Administration (WFA) computer system 122 and a database server known as a Network Service DataBase (NSDB) 120. From the circuit path design information stored in WFA 122, service technicians may be dispatched to install new equipment or cabling, if needed. WFA 122 comprises a processor, database, and software for receiving, processing, and tracking work orders for installation and maintenance organizations.

More importantly, though, from this circuit path design information flow-through can be achieved. Flow-through is an automated process for provisioning communications circuits to satisfy a customer service request. Such a process results in the computer-initiated connection of network elements based upon database entries. These entries or records are comprised of various fields that are utilized in the implementation of flow-through.

The NSDB 120 generally stores the records used in flow-through operations. The NSDB 120 establishes a storage facility for completed service order records. Such records may then be accessed by installation and maintenance technicians, for example, in addition to being used by automated systems for implementing flow-through operations.

The NSDB 120 also parses records for data fields that may be used for implementing cross connections. Such parsed information is reassembled in a line record, which is forwarded by the NSDB 120 to a Transport Element Management System (TEMS) 130. TEMS 130, which is also referred to as Transport, is a Telcordia computer system which hosts processing software and communicates with an Oracle database, in a preferred embodiment. TEMS 130 automates remote provisioning of transport network elements such as Lucent DDM-2000 OC-3 and OC-12 and FT-2000 OC-48 Synchronous Optical NETwork (SONET) multiplexers, Fujitsu FLM-150 and FLM-600 OC-3 and FLM-2400 OC-48 SONET multiplexers, Digital Cross-Connect Systems (DACS), and Electronic Digital Signal Cross-Connects (EDSX's).

TEMS 130 receives a line record and stores that record in a Transport or TEMS database 135. In a preferred embodiment, the TEMS database 135 is an Oracle database. To facilitate flow-through operations, TEMS 130 will formulate and forward messages to the appropriate network elements to establish the connections necessary to implement the designed circuit path that satisfies the customer's service request. These messages are sent to an Extenzor system 140, which is comprised of a processor that hosts Telcordia software for managing network element connectivity in a multi-vendor environment. In an embodiment, Extenzor 140 forwards the messages to the appropriate network elements (NEs) 145 via an X.25 or TCP/IP connection. A message sent to a NE 145 may instruct the NE 145 to turn on an optical transmitter/receiver in order to establish a cross-connect, for example. In an embodiment, the NEs 145 are connected in a ring 146.

However, if such a message contains erroneous data, such as improperly formatted fields that were parsed or extracted from a line record provided by TEMS 130 via Extenzor 140, then a disruption of auto flow-through operations can occur. In order to increase the success rate of flow-through operations, an embodiment of the present invention, referred to herein as the "invention software", may be hosted on a personal computer (PC) 125 in communication with TEMS 130. Other computer platforms, including, but not limited to, a server, a workstation, an array processor, a lap top, and a hand held computer may be employed in alternative embodiments for hosting the invention software.

In an embodiment, an operator may invoke or execute the invention software on the PC 125 to access TEMS 130 and retrieve line records which are each comprised of target fields. The correct format of each target field is critical to the success of flow-through operations. Examples of such target fields include an upstream target identifier (TID) field, a network element location (NEL) field, an auto flow-through (AF) field, an originating system (OS) field, and a TIRKS System Entity Code (TIRKS SEC or TS) field.

Erroneous entries in any of these fields may disrupt the automatic provisioning of services to customers (i.e., flow-through). A goal of flow-through operations is to provide service with the least amount of human intervention possible. Flow-through capability is important to providers of telecommunication services because it allows for Operations, Administration, Maintenance, and Provisioning (OAM&P) of services in a timely manner and on a volume basis. Without such a capability, OAM&P functions must be performed manually. Manual performance of OAM&P functions is generally inefficient and expensive. In an embodiment, the invention software may be invoked automatically as a cron job. A cron job executes files periodically based upon entries (e.g., filename, day of week, time, etc.) in a cron table or cron file.

In an embodiment, the invention software executes on a PC 125 to verify that each target field contains a valid entry. Invalid entries may optionally be output to an operator's screen, printed out in hardcopy form, logged as a validation results file for subsequent processing, and/or automatically corrected. An exemplary processing embodiment is subsequently described in FIG. 2A through FIG. 6. These figures present exemplary mechanisms for processing the five fields described above that are critical to maintaining flow-though operations.

Figure 2A:
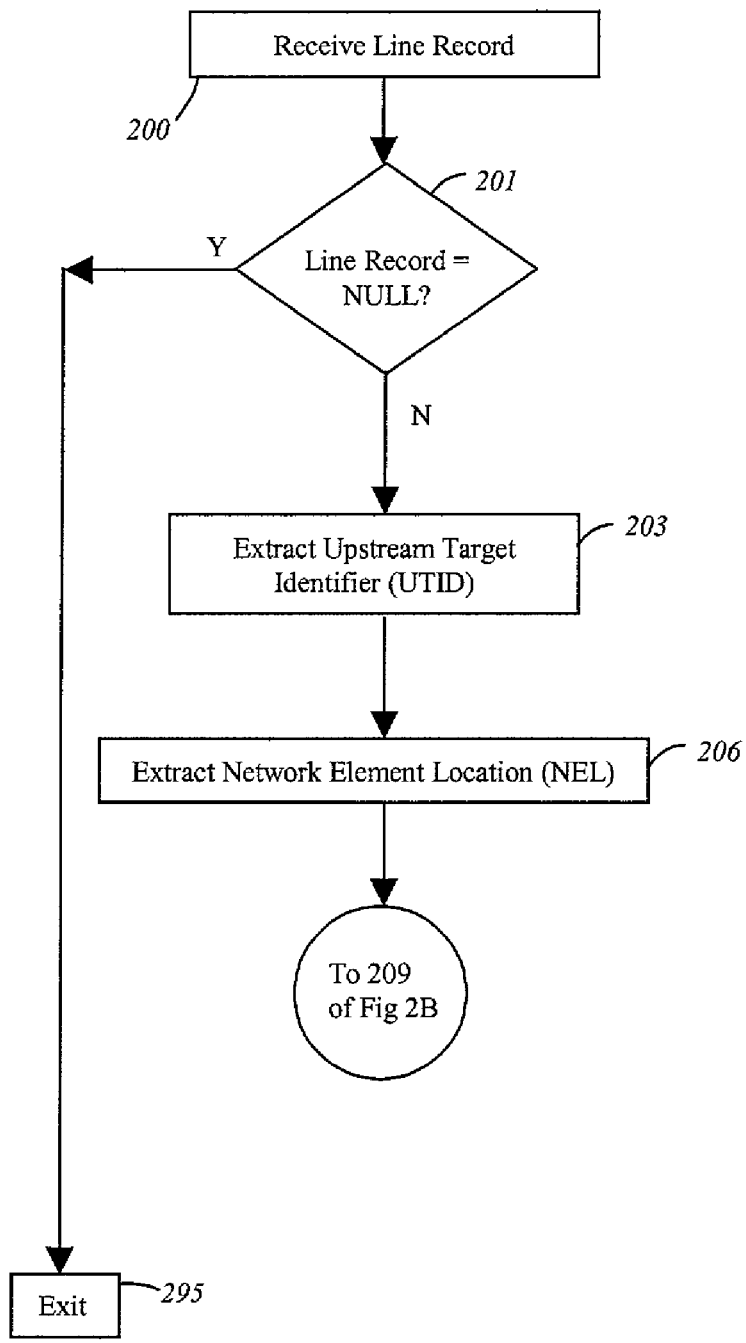
FIG. 2A illustrates a first portion of a flow chart for an exemplary process for verifying upstream target identifiers (TIDs), according to an embodiment of the present invention.
Figure 2B:
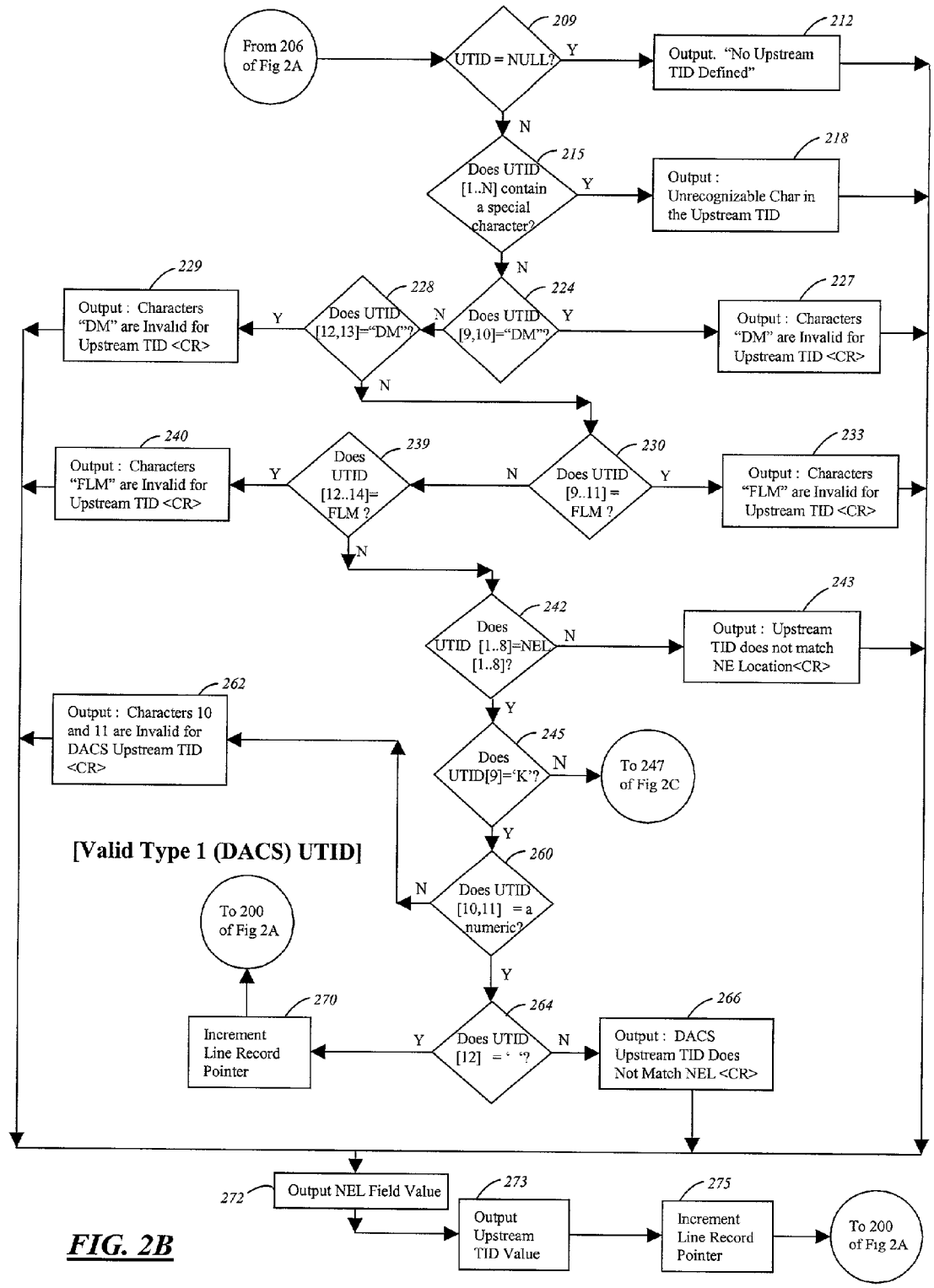
FIG. 2B illustrates a second portion of the flow chart for an exemplary process for verifying upstream target identifiers (TIDs), according to an embodiment of the present invention.
Figure 2C:
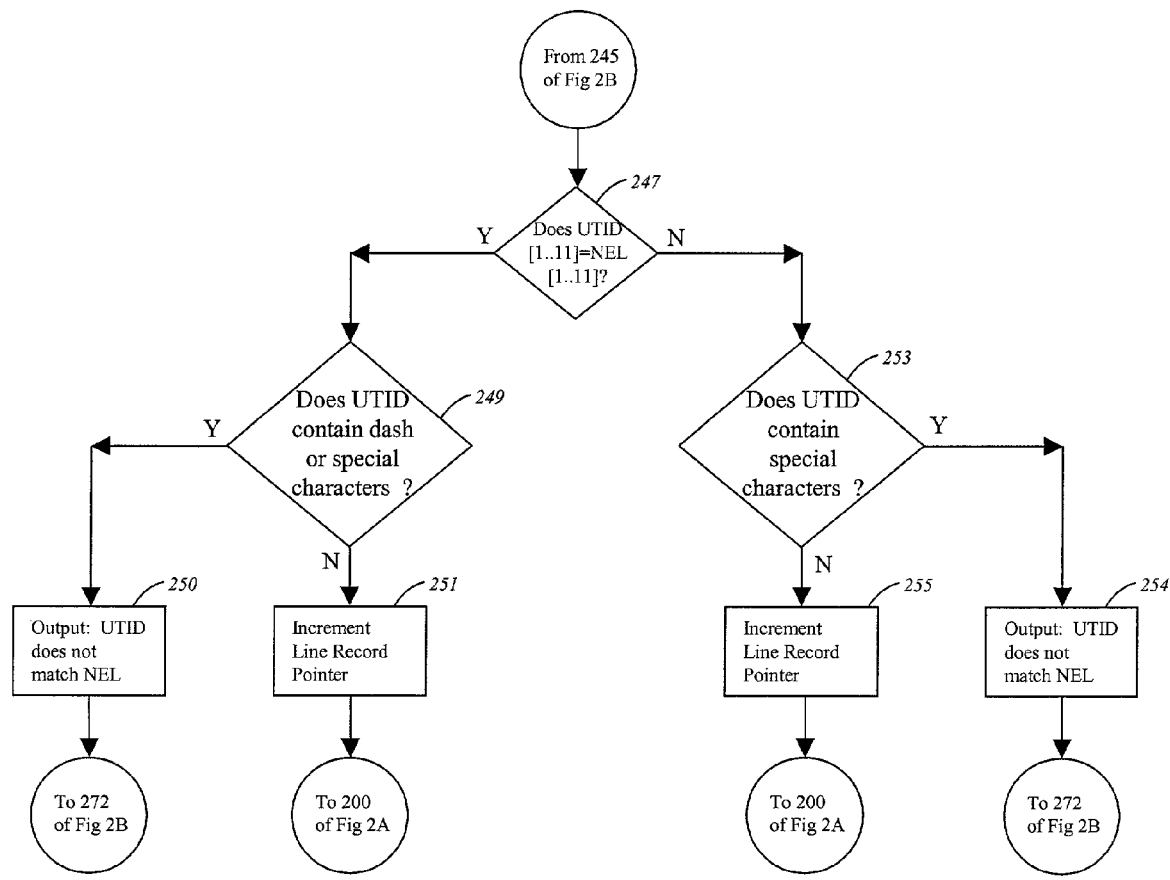
FIG. 2C illustrates a final portion of the flow chart for an exemplary process for verifying upstream target identifiers (TIDs), according to an embodiment of the present invention.

FIGS. 2A, 2B, and 2C, taken together, illustrate a flow chart for an exemplary process, according to an embodiment of the present invention. In such embodiment, the invention software executes on a PC 125 to perform error checking of an upstream target identifier (TID) field. A valid upstream TID field is essential for successful flow-through operations.

Valid upstream TID fields may exist in one of three formats. A type 1 or DACS upstream TID contains an eight character Common Language Location Identification (CLLI) code, followed by the letter 'K', then a two digit number. DACS is an acronym for Digital Access Cross Connect Switch (or Digital Cross Connect Switch), which is a switch for cross connecting communications circuits. A type two upstream TID contains an 11 character CLLI code followed by an alpha numeric string indicating either the rack location of a switch or a digital multiplexer cable designator. A type three upstream TID contains an eight character CLLI code, followed by a dash ('-') in the ninth position and an alphanumeric string indicating either the rack location of a switch or a digital multiplexer cable designator. CLLI codes were developed by Telcordia to uniquely identify sites or network elements in a telecommunications environment. Eleven character CLLI codes are of the format AAAABBCCDDD, wherein AAAA represents a geographical location, BB represents a state, CC represents a network site, and DDD represents a network entity. Eight character CLLI codes are of the format AAAABBCC, with the strings AAAA, BB, and CC having the same meanings as for the eleven character CLLI code.

At step 200 of FIG. 2A, the invention software executing on PC 125 receives a line record from TEMS 130. As an initial test, the invention software determines whether the received line record is NULL in step 201. If a NULL line record has been received, processing is exited at step 295.

If a non-NULL line record has been received, processing continues at step 203, where the invention software extracts an upstream target identifier (TID) field from the line record. Next, a network element location (NEL) field is extracted from the line record in step 206.

Continuing with FIG. 2B, the invention software determines whether the upstream TID field is NULL in step 209. If the upstream TID field is NULL, then the invention software outputs "No Upstream TID Defined" in step 212. The NEL field value and the upstream TID field value are subsequently output in steps 272 and 273, respectively. A line record pointer is then incremented in step 275, and processing returns to step 200 (of FIG. 2A). As previously discussed, in alternative embodiments output may be forwarded to a computer screen, a printer for hardcopy generation, and/or a log file for electronic storage and follow-on processing.

If there is data in the upstream TID field (i.e., the upstream TID field is non-null), as determined in step 209, then the invention software scans the upstream TID field in step 215 to determine if the field contains a special character. Special characters comprise non-alphanumerics, including blanks (or spaces) but excluding dashes ('-'). If a special character is found at step 215, then the invention software outputs "Unrecognizable character in the Upstream TID" at step 218. The NEL field value and the upstream TID field value are subsequently output in steps 272 and 273, respectively. A line record pointer is then incremented in step 275, and processing returns to step 200 (of FIG. 2A).

In this exemplary embodiment, the next test is performed at step 224 by the invention software executing on PC 125 to determine whether positions nine and ten of the upstream TID field contain the digraph "DM". If so, then in step 227 the invention software outputs "Characters DM are invalid for Upstream TID." The NEL field value and the upstream TID field value are subsequently output in steps 272 and 273, respectively. A line record pointer is then incremented in step 275, and processing returns to step 200 (of FIG. 2A).

If the characters "DM" do not appear in positions nine and ten of the upstream TID field, as determined in step 224, then in step 228 the invention software determines whether positions twelve and thirteen of the upstream TID field contain the digraph "DM." If so, the invention software in step 229 outputs "Characters DM are invalid for Upstream TID." The NEL field value and the upstream TID field value are subsequently output in steps 272 and 273, respectively. A line record pointer is then incremented in step 275, and processing returns to step 200 (of FIG. 2A).

Returning to step 228, if positions twelve and thirteen do not contain the digraph "DM," then in step 230 the invention software determines if the trigraph "FLM" appears in positions nine through eleven of the upstream TID field. If so, then in step 233 the invention software outputs "Characters FLM are invalid for Upstream TID." The NEL field value and the upstream TID field value are subsequently output in steps 272 and 273, respectively. A line record pointer is then incremented in step 275, and processing returns to step 200 (of FIG. 2A).

If the characters "FLM" do not appear in positions nine through eleven of the upstream TID field, as determined by the invention software in step 230, then in step 239 the invention software determines whether the trigraph "FLM" appears in positions twelve through fourteen of the upstream TID field. If so, then in step 240 the invention software outputs "Characters FLM are invalid for Upstream TID." The NEL field value and the upstream TID field value are subsequently output in steps 272 and 273, respectively. A line record pointer is then incremented in step 275, and processing returns to step 200 (of FIG. 2A).

If the "FLM" trigraph was not found in positions twelve through fourteen of the upstream TID field (step 239), then processing continues at step 242. At this step the invention software performs a string compare of the first eight characters of the upstream TID and NEL fields. If they are not equal, then at step 243 the invention software outputs "Upstream TID does not match NE Location." The NEL field value and the upstream TID field value are subsequently output in steps 272 and 273, respectively. A line record pointer is then incremented in step 275, and processing returns to step 200 (of FIG. 2A).

Returning to step 242, if the first eight characters of the upstream TID and the NEL match, then in step 245 the invention software determines whether the letter 'K' exists in position nine of the upstream TID field. If the letter 'K' is found in position nine of the upstream TID, then processing continues with step 260. At step 260 the invention software determines if upstream TID positions ten and eleven contain numeric values.

If, as determined in step 260, upstream TID positions ten and eleven are numeric, then the invention software determines at step 264 whether the upstream TID field position twelve is a space (i.e., a ' '). If not, then in step 266 the invention software outputs "DACS Upstream TID Does Not Match NEL." The NEL field value and the upstream TID field value are subsequently output in steps 272 and 273, respectively. A line record pointer is then incremented in step 275, and processing returns to step 200 (of FIG. 2A).

If, as determined in step 260, the invention software finds that upstream TID positions ten and eleven are not numeric, then the software outputs "Characters 10 and 11 are invalid for DACS Upstream TID" in step 262. The NEL field value and the upstream TID field value are subsequently output in steps 272 and 273, respectively. A line record pointer is then incremented in step 275, and processing returns to step 200 (of FIG. 2A).

Returning to step 264, if position twelve of the upstream TID field is a space, then the upstream TID field contains a valid type 1 (DACS) upstream TID value. A line record pointer is subsequently incremented by the invention software in step 270, and execution loops back to step 200 (of FIG. 2A) in order to process the next line record (and upstream TID).

Returning to step 245, if the letter 'K' is not found in position nine of the upstream TID field, then processing continues with step 247 of FIG. 2C. FIG. 2C comprises a final portion of the upstream TID processing algorithm in which the invention software determines whether a valid type 2 or type 3 upstream TID exists in the current line record.

At step 247 the invention software performs a string compare to determine whether the first eleven characters of the upstream TID field match the first eleven characters of the NEL field. If so, then processing to determine if the current line record contains a valid type 2 upstream TID takes place starting with step 249.

The invention software in step 249 parses the upstream TID field searching for the occurrence of a dash or special characters. Special characters (as previously defined) comprise non-alphanumerics, including a space (but excluding a dash). If any special characters or a dash are found, then the software outputs "UTID does not match NEL" in step 250. Processing subsequently returns to step 272 of FIG. 2B.

At step 249, if neither a dash nor any special characters are found by the invention software, then the current line record contains a valid type 2 upstream TID. At this point, the invention software increments a line record pointer in step 251, and loops back to step 200 of FIG. 2A to process the next line record.

Returning to step 247, if the first eleven characters of the upstream TID and NEL fields do not match, then the invention software processes the field to determine if that field is a valid type 3 upstream TID field. In step 253, the software parses the upstream TID field to determine whether the Upstream TID field contains any special characters (i.e., non-alphanumerics, including a space, but not including a dash). If the invention software determines that special characters exist in the upstream TID field, then the software outputs "UTID does not match NEL in step 254. Processing subsequently returns to step 272 of FIG. 2B.

Returning to step 249, if special characters are not found in the upstream TID field by the invention software, then the current line record contains a valid type 3 upstream TID. The invention software next increments a line record pointer in step 255, then loops back to step 200 of FIG. 2A to process the next line record.

Processing of all line records in the manner described by the flow charts of FIG. 2A, 2B and FIG. 2C results in each Upstream TID field being processed for each line record.

Erroneous TID values will be flagged for subsequent correction by a system administrator in one embodiment.

Figure 3:
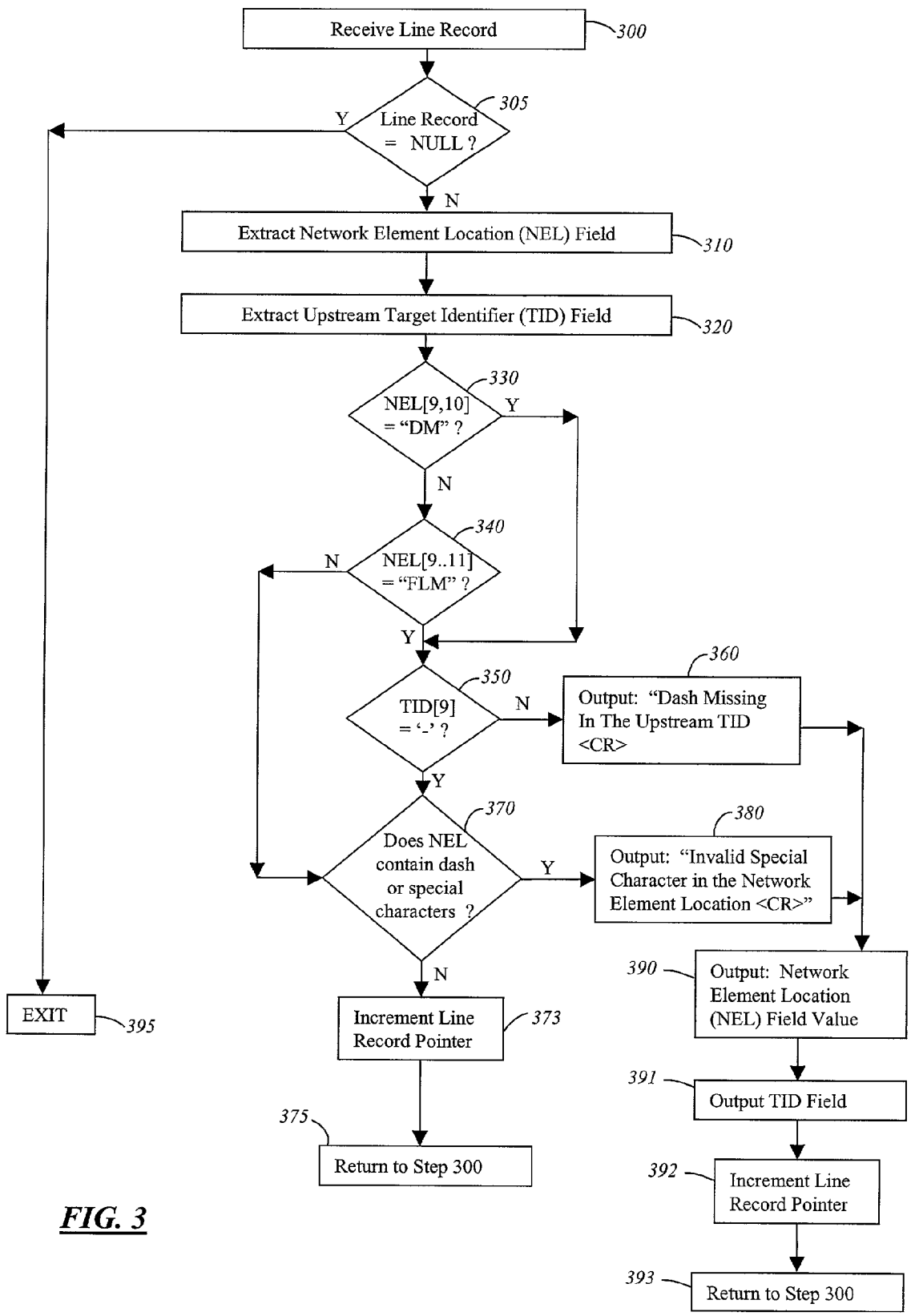
FIG. 3 comprises a flow chart illustrating a process for verifying network element location values, according to an embodiment of the present invention.

Processing of all line records maintained by TEMS 130 in a TEMS database 135 to verify network element location (NEL) fields takes place according to the flow chart of FIG. 3 in an exemplary embodiment of the present invention.

To verify a NEL field of a line record, the invention software executing on PC 125 initially receives a line record from TEMS 130 in step 300. Next, the software determines if the line record is NULL in step 305. If so, then processing exits at step 395.

If the received line record is not NULL, as determined in step 305, then the invention software extracts a network element location (NEL) field from the line record in step 310. The invention software also extracts an upstream TID field from the line record in step 320.

In step 330 the present invention determines if positions nine and ten of the NEL contain the digraph "DM". If so, processing continues at step 350.

If, as determined in step 330, positions nine and ten of the NEL field do not contain the digraph "DM," then the invention software next determines if positions nine through eleven of the NEL field contain the trigraph "FLM" in step 340. If not, then processing continues at step 370.

If the NEL field contains the trigraph "FLM" in positions nine through eleven (step 340) and not the digraph "DM" in positions nine and ten (step 330), then processing continues with step 350. In step 350 the invention software determines whether the upstream TID contains a dash ('-') in position nine (of the upstream TID field). If a dash ('-') is not in position nine of the upstream TID, the software outputs "Dash missing in the Upstream TID" at step 360. The NEL field value and the upstream TID field value are subsequently output in steps 390 and 391, respectively. A line record pointer is then incremented in step 392, and processing returns to step 300 from step 393.

Returning to step 350, if a dash ('-') is found in position nine of the upstream TID contained in the current line record, then processing continues with step 370. At this step (370), the invention software determines whether the NEL field contains either a dash or any special characters (which were previously defined as non-alphanumerics, including a space but excluding a dash). If the NEL field contains a dash or special characters, in step 380 the software outputs "Invalid character in the Network Element Location." The NEL field value and the upstream TID field value are subsequently output in steps 390 and 391, respectively. A line record pointer is then incremented in step 392, and processing returns to step 300 from step 393.

Returning to step 370, if neither a dash nor any special characters are found to exist within the NEL field, then the NEL field is considered to be of a valid format at this point in the processing flow chart of FIG. 3. In step 373, the invention software increments a line record pointer then returns to step 300 from step 375.

When all line records (and thus all NEL fields) have been processed, a NULL line record is received and recognized by the invention software in steps 300 and 305, respectively. Processing then exits via step 395.

Figure 4:
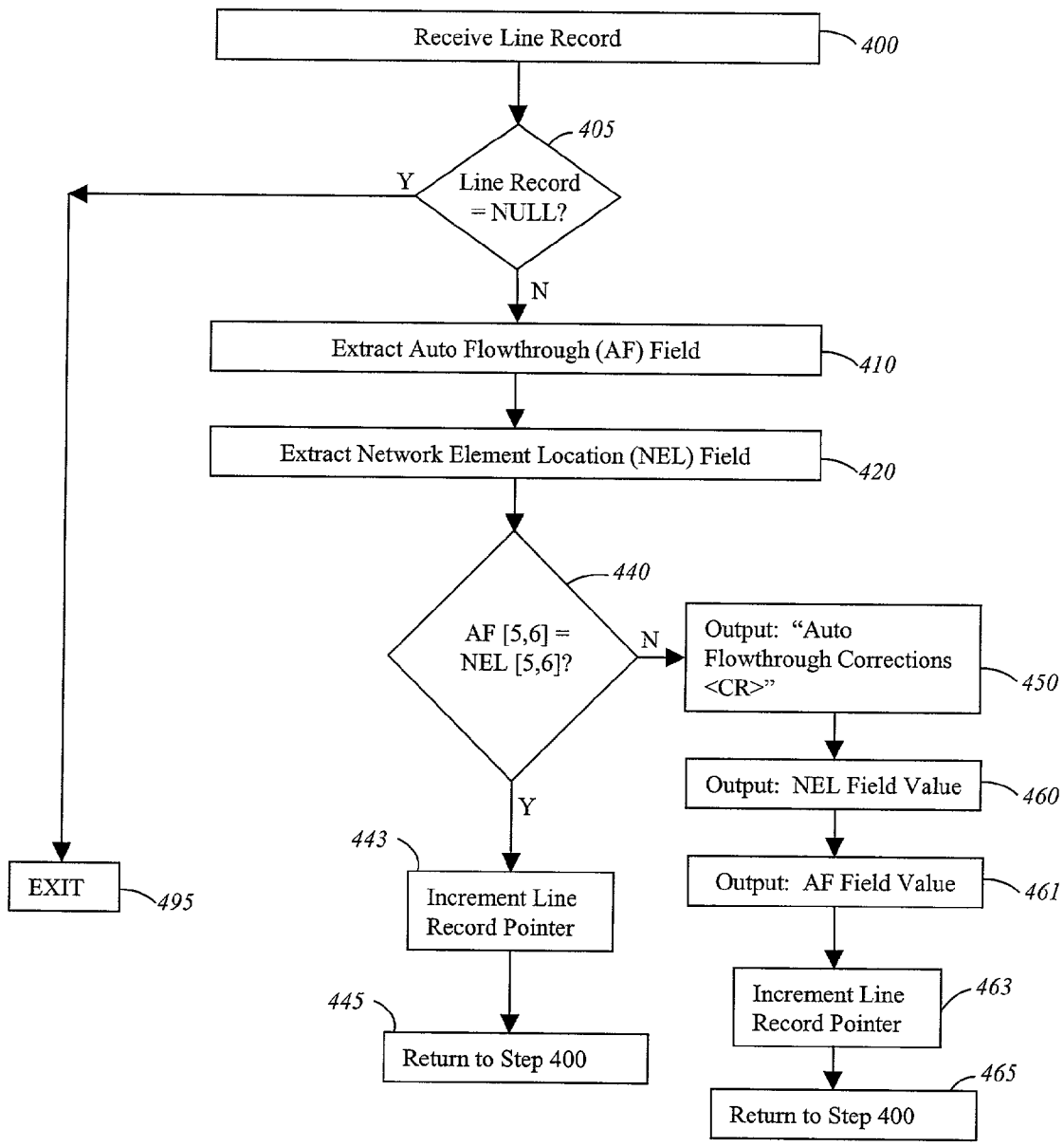
FIG. 4 illustrates a flow chart for an exemplary process for error checking auto flow-through values, according to an embodiment of the present invention.

Processing of all line records maintained by TEMS 130 in a TEMS database 135 to verify auto flow-through (AF) fields takes place according to the flow chart of FIG. 4 in an exemplary embodiment of the present invention.

To verify an AF field contained in a line record, the invention software executing on PC 125 initially receives a line record from TEMS 130 in step 400. Next, the software determines if the line record is NULL in step 405. If so, then processing exits at step 495.

If the received line record is not NULL, as determined in step 405, then the invention software extracts an auto flow-through (AF) field from the line record in step 410. The invention software also extracts a network element location (NEL) field from the line record in step 420.

At step 440, an embodiment of the present invention determines whether positions five and six of the AF field equal positions five and six of the NEL field. If not, then the invention software in step 450 outputs "Auto Flowthrough Corrections." The NEL field value and the AF field value are output in steps 460 and 461, respectively. A line record pointer is subsequently incremented in step 463, and processing returns to step 400 from step 465.

However, if positions five and six of the AF and NEL fields were found to be equal at step 440, then the AF field is considered to be of a valid format at this point in the processing flow chart of FIG. 4. In step 443, the invention software increments a line record pointer, and returns to step 400 from step 445.

When all line records (and thus all AF fields) have been processed, a NULL line record is received and recognized by the invention software in steps 400 and 405, respectively. Processing then exits via step 495.

Figure 5:
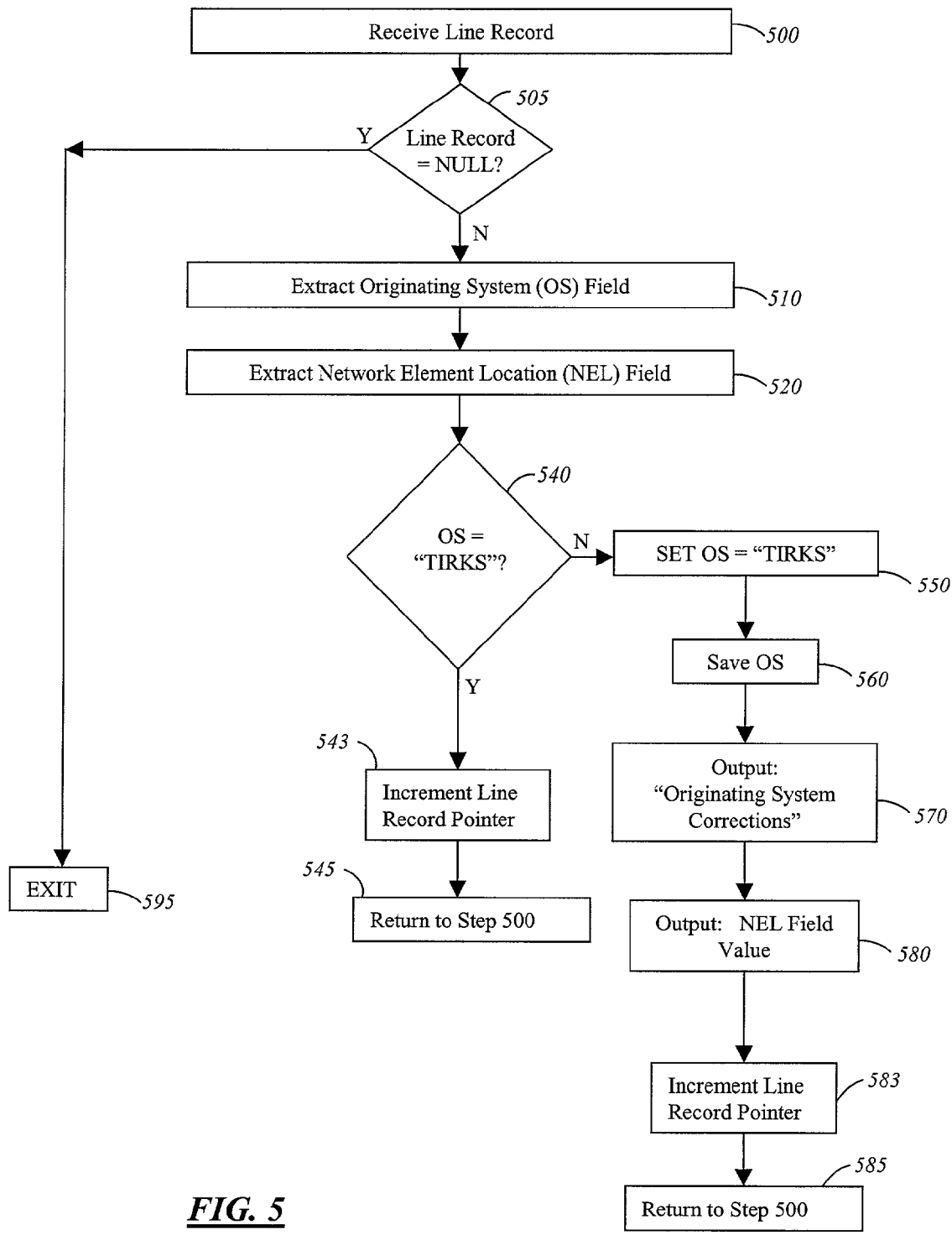
FIG. 5 illustrates a flow chart for an exemplary process for error checking originating system values, according to an embodiment of the present invention.

Processing of all line records maintained by TEMS 130 in a TEMS database 135 to verify originating system (OS) fields takes place according to the flow chart of FIG. 5 in one embodiment of the present invention.

To verify an OS field contained in a line record, the invention software executing on PC 125 initially receives a line record from TEMS 130 in step 500. Next, the software determines if the line record is NULL in step 505. If so, then processing exits at step 595.

If the received line record is not NULL, as determined in step 505, then the invention software extracts an originating system (OS) field from the line record in step 510. The invention software also extracts a network element location (NEL) field from the line record in step 520.

At step 540, an embodiment of the present invention determines whether the OS field contains the string "TIRKS" by executing a string compare method. If not, then in step 550 the invention software sets the OS field to the string "TIRKS" and saves or overwrites the updated OS field in step 560 to the current line record in the TEMS database 135. The invention software next outputs "Originating System Corrections" in step 570. The NEL field value is subsequently output in step 580, a line record pointer is incremented in step 583, and processing returns to step 500 from step 585.

Returning to step 540, if the OS field is found to be equal to the string "TIRKS", then the OS field is considered to be of a valid format at this point in the processing flow chart of FIG. 5. In step 543, the invention software increments a line record pointer, and returns to step 500 from step 545.

When all line records (and thus all OS fields) have been processed, a NULL line record is received and recognized by the invention software in steps 500 and 505, respectively. Processing then exits via step 595.

Figure 6:
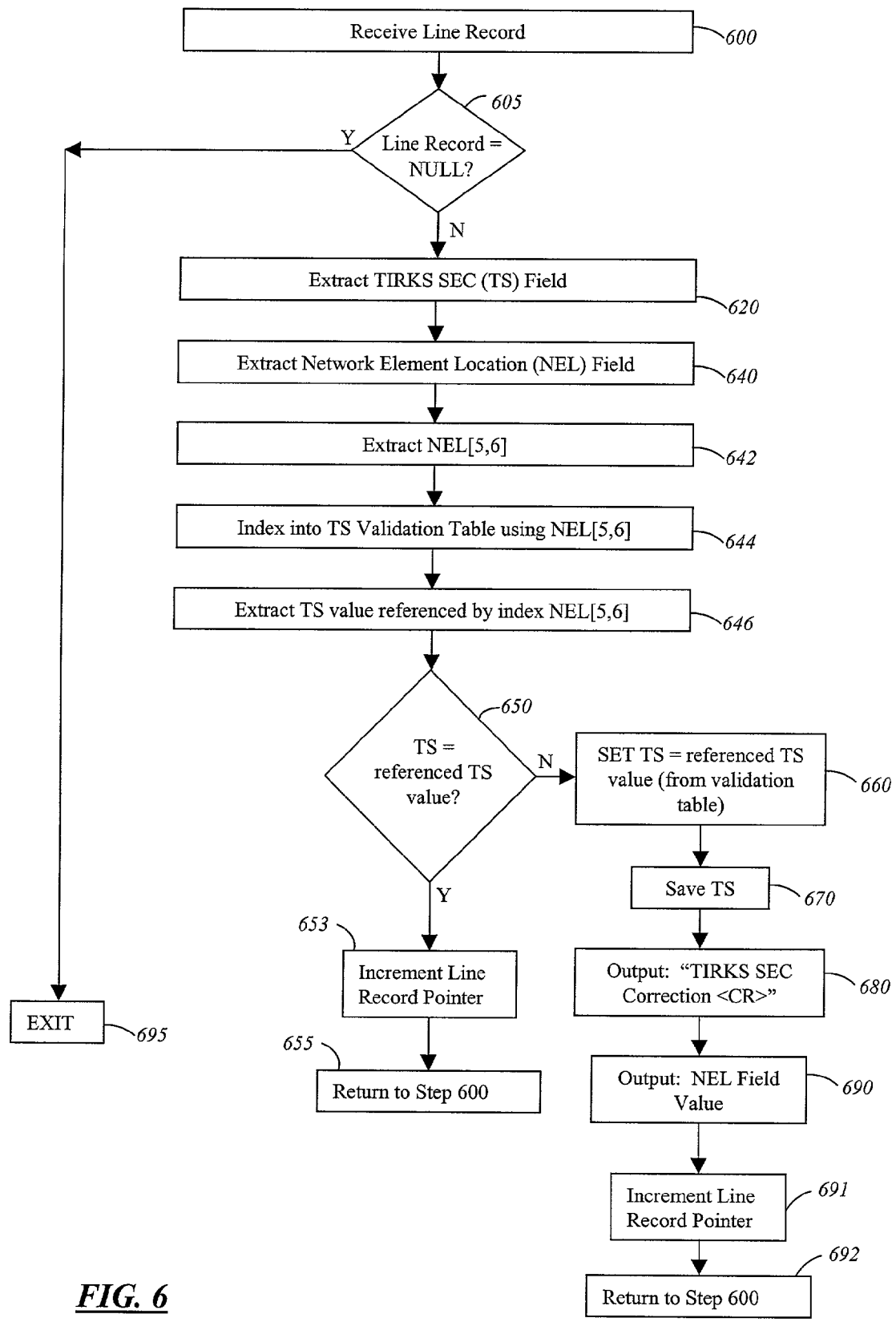
FIG. 6 illustrates a flow chart for an exemplary process for error checking TIRKS SEC values, according to an embodiment of the present invention.

Processing of all line records maintained by TEMS 130 in a TEMS database 135 to verify TIRKS System Entity Code (TIRKS SEC or TS) fields takes place according to the flow chart of FIG. 6 in an exemplary embodiment of the present invention.

To verify a TIRKS SEC field contained within a line record, the invention software executing on PC 125 initially receives the line record from TEMS 130 in step 600. Next, the software determines whether the line record is NULL in step 605. If so, then processing exits at step 695.

If the received line record is not NULL, as determined in step 605, then the invention software extracts a TIRKS SEC field from the line record in step 620. The invention software also extracts a network element location (NEL) field from the line record in step 640.

At step 642, the software extracts a digraph (i.e., two characters) located at positions five and six within the NEL field. In step 644, this digraph is used to index into a TIRKS SEC validation table. The invention software subsequently extracts the value in the validation table that is referenced by the digraph index in step 646.

At step 650, an exemplary embodiment of the present invention compares the TIRKS SEC field value, which was extracted from the line record in step 620, to the extracted TIRKS SEC validation table value of step 646, which was referenced by the digraph index. If these two values are not equal, then in step 660 the invention software sets the TIRKS SEC field value in the line record to the referenced TIRKS SEC value from the validation table (from step 646) and saves or overwrites the updated TIRKS SEC field in step 670 to the current line record in the TEMS database 135.

The invention software next outputs "TIRKS SEC Corrections" in step 680. The NEL field value is subsequently output in step 690, a line record pointer is incremented in step 691, and processing returns to step 600 from step 692.

Returning to step 650, if the TIRKS SEC field value, which was extracted from the line record in step 620, equals the extracted TIRKS SEC validation table value of step 646, then the TIRKS SEC field is considered to be of a valid format at this point in the processing flow chart of FIG. 6. In step 653, the invention software increments a line record pointer, and returns to step 600 from step 655.

When all line records (and thus all TIRKS SEC fields) have been processed, a NULL line record is received and recognized by the invention software in steps 600 and 605, respectively. Processing then exits via step 695.

The terms error checking, verification, and validation may be used interchangeably when discussing embodiments of the present invention. Additionally, the output or validation results produced may be logged or recorded in a file for future use (e.g., for reporting or statistical analysis purposes). Such results may also be presented or displayed to a user of an embodiment of the present invention via a graphical user interface or other display means.

The preceding example illustrates an embodiment of the present invention in which one target field is processed for each line record received by the invention software. Other embodiments allow for the processing of more than one target field for each line record received. Such other embodiments may be readily derived by one skilled in the art from the discussed exemplary embodiment.

Various embodiments of the present invention have been described in fulfillment of the various objects of the invention. It should be recognized that these embodiments are merely illustrative of the principles of the present invention. Numerous modifications and adaptations thereof will be apparent to those skilled in the art without departing from the spirit and scope of the present invention.

What is claimed is:

1. A method for verifying a data field in a telecommunications environment employing flow-through operations, the method comprising:

receiving a line record;

extracting a target field from the line record, the target field comprising one of the following types: type one, type two, and type three, wherein type one comprises an eight character common language location identification (CLLI) code followed by a letter 'K' and then a two digit number, type two comprises an 11 character CLLI code followed by an alpha numeric string indicating either a rack location of a switch or a digital multiplexer cable designator, and wherein type three comprises an eight character CLLI code followed by a dash ('-') in a ninth position and an alphanumeric string indicating either the rack location of a switch or a digital multiplexer cable designator; and validating the target field prior to the target field entering the flow-through operations by examining the target field to verify that the target field includes a valid entry or to verify that the target field does not include an erroneous entry, thereby operating to prevent a disruption of the flow-through operations.

2. The method of claim 1, further comprising:

producing a validation result; and logging the validation result.

3. The method of claim 2, wherein extracting the target field comprises extracting an upstream target identifier field.

4. The method of claim 2, wherein extracting the target field comprises extracting a network element location field.

5. The method of claim 2, wherein extracting the target field comprises extracting an auto flow-through field.

6. The method of claim 2, wherein extracting the target field comprises extracting an originating system field.

7. The method of claim 2, wherein extracting the target field comprises extracting a TIRKS SEC field.

8. The method of claim 2, wherein extracting the target field comprises extracting at least two of an upstream target identifier field, a network element location field, an auto flow-through field, an originating system field, and a TIRKS SEC field.

9. A system for verifying a data field in a telecommunications environment employing flow-through operations, the system comprising:

a receiving means for receiving a line record;

an extraction means for extracting a target field from the line record, the target field comprising one of the following types: type one, type two, and type three, wherein type one comprises an eight character common language location identification (CLLI) code followed by a letter 'K' and then a two digit number, type two comprises an 11 character CLLI code followed by an alpha numeric string indicating either a rack location of a switch or a digital multiplexer cable designator, and wherein type three comprises an eight character CLLI code followed by a dash ('-') in a ninth position and an alphanumeric string indicating either the rack location of a switch or a digital multiplexer cable designator; and a validation means for validating a format of the target field prior to the target field entering the flow-through operations by examining the target field to verify that the target field includes a valid entry and/or to verify that the target field does not include an erroneous entry, thereby operating to prevent a disruption of the flow-through operations.

10. The system of claim 9, further comprising:

and output means for producing a validation result; and a recording means for logging the validation result.

11. The system of claim 10, wherein the target field comprises an upstream target identifier field.

12. The system of claim 10, wherein the target field comprises a network element location field.

13. The system of claim 10, wherein the target field comprises an auto flow-through field.

14. The system of claim 10, wherein the target field comprises an originating system field.

15. The system of claim 10, wherein the target field comprises a TIRKS SEC field.

16. The system of claim 10, wherein the target field comprises at least two of an upstream target identifier field, a network element location field, an auto flow-through field, an originating system field, and a TIRKS SEC field.

17. A computer readable medium for implementing a method for verifying a data field in a telecommunications environment employing flow-through operations, the method comprising:
  receiving a line record;
  extracting a target field from the line record, the target field comprising one of the following types: type one, type two, and type three, wherein type one comprises an eight character common language location identification (CLLI) code followed by a letter 'K' and then a two digit number, type two comprises an 11 character CLLI code followed by an alpha numeric string indicating either a rack location of a switch or a digital multiplexer cable designator, and wherein type three comprises an eight character CLLI code followed by a dash ('-') in a ninth position and an alphanumeric string indicating either the rack location of a switch or a digital multiplexer cable designator; and
  validating the target field prior to the target field entering the flow-through operations by examining the target field to verify that the target field includes a valid entry and/or to verify that the target field does not include an erroneous entry, thereby operating to prevent a disruption of the flow-through operations.

18. A method for verifying a data field in a telecommunications environment employing flow-through operations, the method comprising:
  receiving a line record;
  extracting a target field from the line record, the target field selected from at least one of an upstream target identifier field, a network element location field, an auto flow-through field, an originating system field, or a TIRKS SEC field, the target field comprising one of the following types: type one, type two, and type three, wherein type one comprises an eight character common language location identification (CLLI) code followed by a letter 'K' and then a two digit number, type two comprises an 11 character CLLI code followed by an alpha numeric string indicating either a rack location of a switch or a digital multiplexer cable designator, and wherein type three comprises an eight character CLLI code followed by a dash ('-') in a ninth position and an alphanumeric string indicating either the rack location of a switch or a digital multiplexer cable designator; and
  validating the target field prior to the target field entering the flow-through operations by examining the target field to verify that the target field includes a valid entry and/or to verify that the target field does not include an erroneous entry, thereby operating to prevent a disruption of the flow-through operations.

19. A computer readable medium for implementing a method for verifying a data field in a telecommunications environment employing flow-through operations, the method comprising:
  receiving a line record;
  extracting a target field from the line record, the target field selected from at least one of an upstream target identifier field, a network element location field, an auto flow-through field, an originating system field, or a TIRKS SEC field, the target field comprising one of the following types: type one, type two, and type three, wherein type one comprises an eight character common language location identification (CLLI) code followed by a letter 'K' and then a two digit number, type two comprises an 11 character CLLI code followed by an alpha numeric string indicating either a rack location of a switch or a digital multiplexer cable designator, and wherein type three comprises an eight character CLLI code followed by a dash ('-') in a ninth position and an alphanumeric string indicating either the rack location of a switch or a digital multiplexer cable designator; and
  validating the target field prior to the target field entering the flow-through operations by examining the target field to verify that the target field includes a valid entry and/or to verify that the target field does not include an erroneous entry, thereby operating to prevent a disruption of the flow-through operations.

* * * * *